Patented Aug. 11, 1942

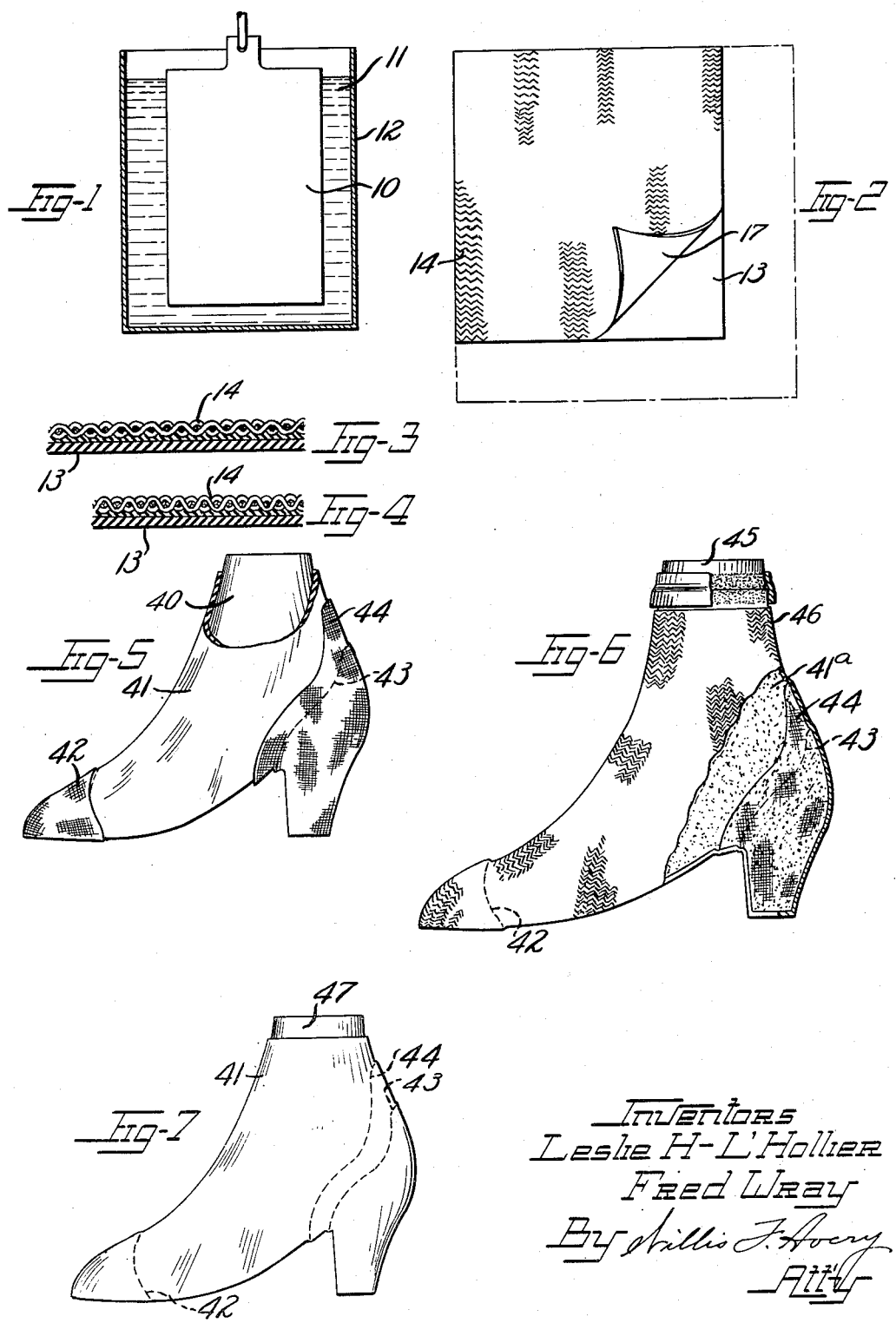

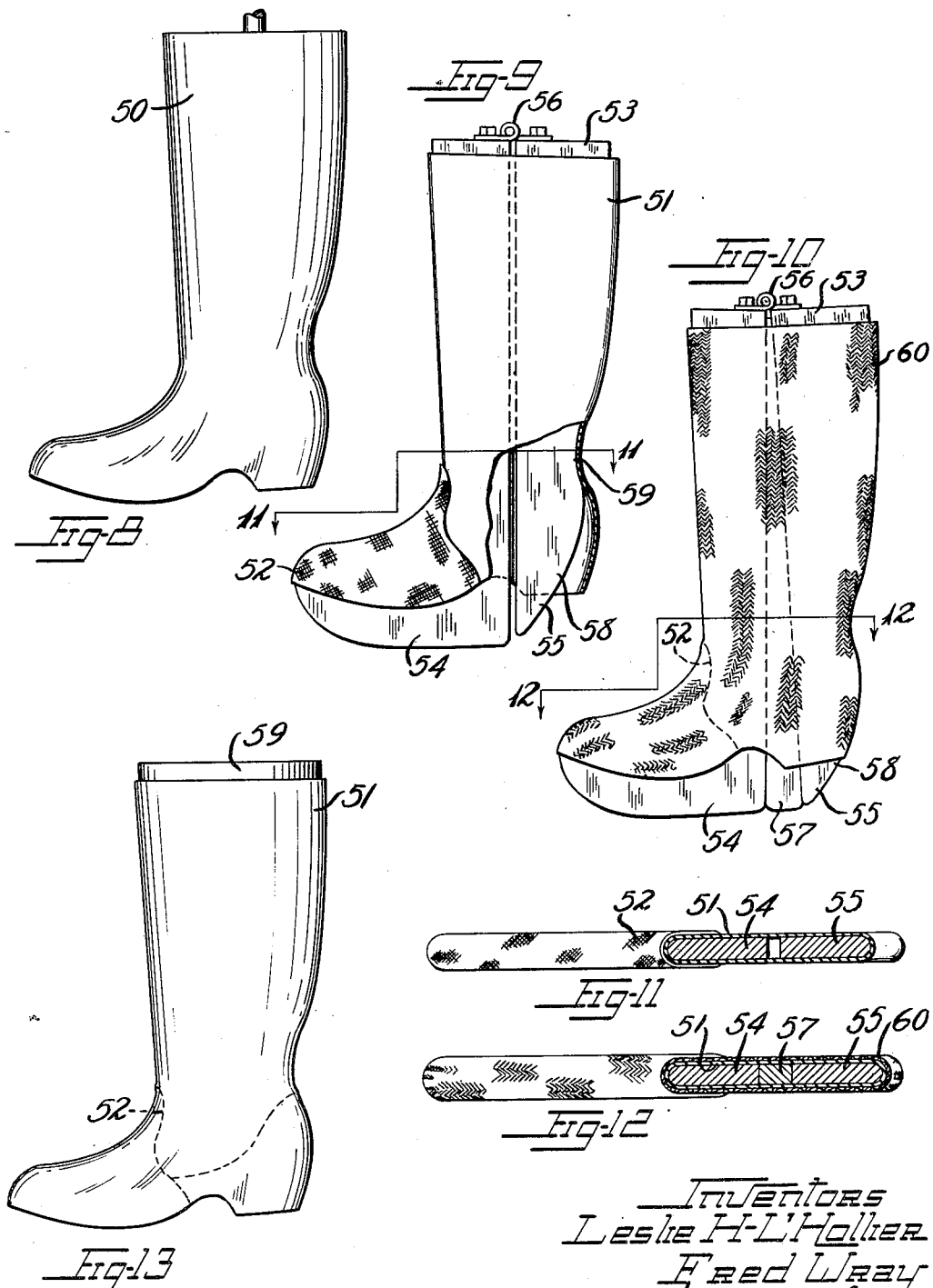

2,292,455

UNITED STATES PATENT OFFICE 2,292,455

METHOD OF MAKING STRETCHABLE FOOTWEAR

Leslie H. L'Hollier, Waltham, Mass., and Fred Wray, Burton on Trent, England, assignors to The B. F. Goodrich Company, New York, N. Y., a corporation of New York Application March 23, 1939, Serial No. 263,688

12 Claims. (Cl. 12—142)

This invention relates to methods of reducing the normal area of a sheet of fabric to increase the extensibility of the fabric per unit of length over that which is found in the same material normally and to methods of making articles therefrom and to the articles produced thereby. This application is a continuation-in-part of our application Serial No. 29,680, filed July 3, 1935, now Patent Number 2,155,597, granted April 25, 1939.

The invention is especially useful in the manufacture of hollow articles of rubber and fabric such as footwear and the like where great expansibility of the entire article or a portion thereof is desired.

The principal objects of the invention are to impart greater extensibility to the material per unit of length than is found in the same material normally, to provide localized expansibility in the finished article, to limit expansibility locally of the material, and generally to facilitate procedure and to provide an improved article.

These and other objects will appear from the following description and the accompanying drawings.

Of the drawings:

Fig. 1 is an elevation partly in section showing the production of a rubber film upon a form by deposit from a dispersion of a rubber composition in the practice of the invention in its preferred form.

Fig. 2 illustrates the shrinking of a layer of fabric and the rubber coating, the fabric and rubber being separated at one corner for better illustration.

Fig. 3 is a cross-sectional view of the plied material prior to the shrinking step.

Fig. 4 is a similar illustration of the plied material after shrinkage has taken place.

Fig. 5 is a side view of a shoe form with a layer of rubber and applied fabric reinforcement thereon.

Fig. 6 is a side view of a larger form showing the rubber layer stretched thereon and a fabric lining applied thereto, part of the lining being broken away and part shown in section.

Fig. 7 is a side view of a last showing the article of Fig. 6 reversed and placed thereon, the last being smaller than the form of Fig. 6.

Fig. 8 is a side view of a boot form with a layer of rubber thereon.

Fig. 9 is a side view of the rubber layer of Fig. 8 having a fabric reinforcement applied thereto and placed over a stretching board.

Fig. 10 is a similar view with the rubber layer stretched and a fabric lining applied thereover.

Fig. 11 is a sectional view taken on line 11—11 of Fig. 9.

Fig. 12 is a sectional view taken on line 12—12 of Fig. 10.

Fig. 13 is a side view of a boot last with the rubber and fabric article of Fig. 10 reversed and drawn thereover.

The invention broadly comprises the reduction of the normal area of textile material by adhesively applying to at least one face thereof a layer of unvulcanized rubber composition while the rubber composition is in an abnormally extended condition and then permitting the rubber to recover at least nearly its normal dimensions and thereby compacting the attached fabric layer.

In the preferred form of the invention illustrated in Figs. 5 to 7, this is accomplished by stretching a layer of unvulcanized rubber, preferably formed by deposit from a dispersion thereof, applying a layer of extensible fabric to a face of the rubber and permitting the rubber to return to its normal dimensions whereby the fabric is reduced in area.

The word "rubber" as used herein includes natural rubber and other resilient rubber-like materials.

In the modified form of the invention, illustrated in Figs. 8 to 13, stretching of the rubber is confined to certain areas of the article so that reduction of area of the fabric is localized.

Referring to the drawings, the numeral 10 designates a plate of material immersed in a natural or artificial dispersion 11 of a rubber composition, contained in a tank 12. The plate 10, when removed from the dispersion, carries a layer 13 of deposited rubber composition. This layer may be obtained simply by dipping the plate into the dispersion, or by electrodeposit or coagulant action, as is well understood in the art. If the layer of rubber 13 is removed from one face of the plate, so as not to be restrained, before it has lost all the dispersing medium it will undergo a reduction in area, due to shrinkage of the rubber resulting from the departure of the dispersing medium in it by drying while it is thus unrestrained by plate friction or adhesion.

If a layer of fabric 14 is adhesively applied to one face of the layer 13 of rubber before shrinkage takes place in the rubber, the shrinkage of the rubber layer will correspondingly reduce the area of the fabric, this reduction being considerable, the full shrinkage of the rubber being resisted only by the compacting of the fabric. The reduction in area in principle is illustrated in Fig. 2, where the dot and dash line indicates the original extent of the plied rubber and fabric and the full lines define the final area. The reduction in area of the fabric is made possible by the increased crimping and count of the fabric as illustrated in Figs. 3 and 4, and as shown in Fig. 4, the reduction effected by the shrinkage is not so great as to cause objectionable wrinkles in the material.

To facilitate adhesion of the rubber and fabric, a thin, though not necessarily continuous, layer 17 of rubber composition may be provided on the face of the fabric before the fabric is applied to the layer 13.

Where great extensibility of the plied material is desired it is possible to use knitted materials for the fabric layer, the wales and courses of yarn being more compactable into close order than woven fabrics and also having more inherent elasticity and extensibility.

In practicing the invention, with reference to Figs. 5 to 7, a last-shaped dipping or shaping form 40 corresponding in size to the desired shoe, is first provided with a layer of rubber 41, preferably by deposit from a natural or artificial dispersion of a rubber composition. Reinforcements 42, 43, 44 may then be applied. Thereafter, the rubber layer 41, with the reinforcements, where these are employed, is removed from the last 40 and stretched over a larger last 45 (Fig. 6) to form the upper of the shoe. A lining 46 of woven or knitted fabric is then applied over the rubber layer 41, with as little stretching as possible, and rolled or otherwise worked into adhesive contact with the rubber upper, a coating of rubber cement, indicated by stippling 41a in Fig. 6 being applied, if desired, to promote adhesion. The entire upper is then removed from the last 45 and the recovery of the rubber layer 41 causes shrinking of the lining. The upper is then reversed and placed over a vulcanizing last 47 (Fig. 7) which may have the same size as the form 40 and the shoe is made ready for vulcanization by applying the sole and other elements.

While it is convenient and economical to form the layer of rubber on the form 40 by deposit, such layer may be formed by calendering or otherwise and applied over the form to conform thereto. Where the layer of rubber is deposited on the form, it is dried thereon before removal therefrom. Where such calendered material is used, it may be united by seams. Elasticity of the rubber or its ability to stretch and recover may be controlled by the composition of the material. In some cases, where great stretch and recovery are desired, the layer of rubber 41, whether formed by deposit directly upon the form 40 or by assembly thereon from sheet material, may be partially or fully vulcanized before assembling it with other materials to increase its power of recovery.

The forms and lasts used in constructing the footwear in accordance with the invention, being of generally footwear shape, have surface areas that for the most part are curved in more than one direction at once, such surfaces being sometimes referred to herein as "doubly-curved," and conformance of the footwear materials to such surfaces requires shaping of the materials to correspond. In the case of the rubber upper produced by dipping the doubly-curved surface is provided directly, and in the case of the sheet rubber and the fabric, the conformance is made possible by the stretchability or distortability of these materials.

The fabric reinforcements 42, 43, 44 may be of fabric having little or no stretch and will accordingly limit or prevent stretch of the area of rubber over which they are placed. They may also be formed of fabric adapted to stretch in one direction only and to restrict stretch in other directions. By use of such reinforcements accurate localized control of stretchability of the upper is accomplished.

Control of stretchability of the finished article in other than these localized regions may be accomplished by determinate stretch of the rubber layer before the knitted fabric layer 46 is applied thereto as by determinate selection of the relative size of the form 40 and the form 45.

By use of adjustable formers or lasts the amount of stretch in localized areas of the finished article may be accurately controlled so that the article is more capable of stretch at one portion thereof than at another. Referring to Figs. 8 to 13, the numeral 50 designates a dipping form in the shape of a boot. A layer 51 of rubber may be formed thereabout either by deposit from a dispersion of rubber composition or by assembling sheets of rubber material thereabout. Where the layer is formed by deposit on the form, it is dried thereon. If stretch is to be prevented over certain areas of the rubber layers, a relatively non-stretchable reinforcement 52 of fabric may be applied over the desired area.

The rubber article may be removed from the form 50, preferably by cutting the rubber along the sole of the boot and drawing the article over the shank. After the article is removed from the form, it is drawn over a stretching board 53 comprising complementary members 54, 55 hinged to each other as at 56. A removable wedge 57 may be used to spread the members apart to stretch the rubber. By hinging the board members to each other above the shank of the boot the greatest amount of spreading will take place at the sole of the boot. Further control of spreading is controlled by the shape of the board members. For instance the heel of member 55 may be cut away as at 58 so as not initially to contact with the rubber layer 51 thereby preventing any great stretch in the region of the sole, whereas the ankle portion 59 of the board which is also very remote from the hinge 56 initially contacts the rubber layer and causes great stretch thereof when the wedge 57 is driven home, thereby providing a boot in which the ankle portion has greater extensibility than the shank or the foot portions, a construction which permits the foot to pass the ankle portion in drawing the boot on or removing it from the leg.

The reinforcement 52, applied over the foot portion of the boot is preferably of fabric having one way stretch and is so applied as to prevent stretch lengthwise of the foot but to permit stretch across the foot. Stockinet or similar fabric may be used for this purpose.

After the rubber article 54 is mounted on the stretching board, the wedge 57 is inserted to stretch the article. A layer of fabric 60, which is to provide the lining of the boot is then applied over the surface of the rubber. The fabric is preferably a knit fabric such as stockinet and is cemented in place. The wedge 57 is then removed and the article is removed from the stretching board, reversed, and drawn over a boot last 59 where the sole and other parts of the boot are united to the article on the last to complete the construction of a boot. The boot is vulcanized on the last in the usual manner. When the boot is removed from the stretching board the wales or meshes of the fabric are compacted by the recovery of the rubber.

While the invention is especially suited to the manufacture of stretchable footwear, other articles may be made utilizing the invention, and variations may be made without departing from the spirit of the invention as it is defined by the following claims.

We claim:

1. The method of making footwear which comprises forming a rubber layer on the surface of a form of the desired size, removing the layer to a form of larger size, building a fabric layer over the stretched rubber layer, and removing the form and thereby permitting the rubber layer to approach its original size.

2. The method of making footwear which comprises applying and adhering footwear parts including a fabric lining to a doubly-curved rubber upper while said rubber upper is in substantially stretched condition, and then releasing the tension on the upper to permit it to approach its normal size.

3. The method of making an article of footwear which comprises forming a layer of rubber about a doubly-curved form by a deposit from a dispersion of rubber, drying the layer so formed, transferring the layer of rubber to a second form having greater dimensions than the first form so that the rubber is stretched thereby, applying a textile layer to the exposed face of the stretched rubber on the second form, removing the article from the form to release the tension on the rubber and thereby to compact the wales or meshes of the textile material, transferring the article to a last smaller than the second form, and completing the article by addition of other parts.

4. The method of making an article of footwear which comprises forming a layer of rubber about a doubly-curved form by deposit from a dispersion of rubber, drying the layer so formed, transferring the layer to an expansible form, stretching a portion of the layer by adjustment of the form to increase its dimensions, applying a layer of textile material over the stretched portion of the rubber layer, removing the article to release the tension thereon thereby to compact the textile layer, transferring the article to a last of no greater dimensions than the first-named form, and completing the article by addition of other parts.

5. The method of making an article of footwear which comprises forming a hollow rubber upper, mounting the upper on an expansible form, adjusting the form to stretch a portion of the upper, applying a textile lining over the face of the stretched rubber upper, removing the upper and lining from the form to release the tension on the upper thereby to compact the textile lining, reversing the article and mounting it on a contoured last under less tension than it was subjected to by the expansible form, and completing the article by addition of other parts.

6. The method of making a stretchable composite article which comprises stretching rubber composition in doubly-curved shape to a size larger than the desired size of the final article, said rubber, after being stretched, being in a condition capable of shrinkage, adhering fabric thereto in shape-conforming relation therewith, and permitting shrinkage of the rubber composition to reduce the same to the desired size in the doubly-curved shape and at the same time to effect a reduction in area of the fabric by the compacting action of the shrinking rubber to provide stretchability of the composite material at least commensurate with the reduction in area of the fabric, and vulcanizing the article while the rubber is thus reduced to the desired size.

7. The method of making an article of greater stretchability in a portion thereof than in another portion, which comprises locally stretching sheet rubber material while leaving other portions in a condition of less stretch, adhering fabric thereto, and releasing the stretch on the rubber material to effect compacting of the fabric of the zone whereby the stretchability of the fabric of said zone is increased.

8. The method of making a composite article stretchable in at least a portion thereof which comprises applying to a doubly-curved surface of a form a layer of rubber-like material and effecting a substantially stretched condition of at least a portion of said layer over said surface, applying to said layer and securing thereto upon a stretched portion thereof a layer of textile material, and relieving the tension in said rubber layer of the composite structure and substantially maintaining the doubly-curved shape thereof.

9. The method of making a composite article stretchable in at least a portion thereof which comprises applying to a doubly-curved surface of an outwardly adjustable form a layer of rubber material and effecting a stretched condition of at least a portion of said layer by outward adjustment of a portion of said form, applying to said layer and securing thereto upon a stretched portion thereof a layer of textile material, and relieving the tension in said rubber layer of the composite structure and substantially maintaining the doubly-curved shape thereof.

10. The method of making a composite article stretchable in at least a portion thereof which comprises applying to a doubly-curved surface of a form a layer of rubber and effecting a substantially stretched condition of at least a portion of said layer over said surface by increased dimensions of the form as compared to the unstretched layer, applying to said layer and securing thereto upon a stretched portion thereof a layer of textile material, and relieving the tension in the rubber layer of the composite structure and substantially maintaining the doubly-curved shape thereof.

11. The method of making footwear which comprises the steps of adhering together a fabric layer and a rubber layer while said rubber layer is in a substantially extended condition about a doubly curved form, and then reducing the area of said fabric layer by permitting reduction of the corresponding area of the rubber layer by relaxation from the extended condition.

12. The method of making footwear which comprises the steps of forming a rubber layer having the shape of a footwear upper, substantially stretching said layer upon a doubly curved surface, adhering a layer of fabric to the rubber layer while the latter is in its stretched condition, and then permitting the rubber layer to reduce its area by relaxation from its stretched condition to effect a compacting of the meshes of the fabric.

FRED WRAY.
LESLIE H. L' HOLLIER.